(12) United States Patent  (10) Patent No.: US 9,973,679 B2
Inoue  (45) Date of Patent: May 15, 2018

(54) CONTROL APPARATUS, IMAGE PICKUP APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Koji Inoue, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 14/996,643

(22) Filed: Jan. 15, 2016

(65) Prior Publication Data

US 2016/0212322 A1    Jul. 21, 2016

(30) Foreign Application Priority Data

Jan. 19, 2015  (JP) .................. 2015-007603

(51) Int. Cl.
*H04N 5/232*  (2006.01)

(52) U.S. Cl.
CPC ............................. *H04N 5/23212* (2013.01)

(58) Field of Classification Search
CPC .... H04N 5/23212; H04N 5/374; H04N 5/232; H04N 5/3696; H04N 5/3572; H04N 2101/00
USPC ....................................................... 348/353
See application file for complete search history.

(56) References Cited

U.S. PATENT DOCUMENTS

| | | | |
|---|---|---|---|
| 4,410,804 A | 10/1983 | Stauffer | |
| 7,831,138 B2* | 11/2010 | Nakahara | G03B 13/36 348/349 |
| 8,872,961 B2* | 10/2014 | Kimura | H04N 5/23212 348/345 |
| 9,451,148 B2* | 9/2016 | Sugawara | H04N 5/23212 |
| 2006/0008265 A1* | 1/2006 | Ito | G02B 7/102 396/125 |
| 2007/0206940 A1* | 9/2007 | Kusaka | G03B 13/28 396/128 |
| 2010/0150538 A1* | 6/2010 | Ono | G03B 13/00 396/104 |
| 2010/0265381 A1* | 10/2010 | Yamamoto | G02B 27/0025 348/335 |
| 2012/0169917 A1* | 7/2012 | Isobe | G02B 7/08 348/345 |
| 2013/0021514 A1* | 1/2013 | Kamimura | H04N 5/23209 348/340 |
| 2014/0118610 A1* | 5/2014 | Ohara | H04N 5/23212 348/349 |
| 2014/0340567 A1* | 11/2014 | Fukuda | H04N 5/23212 348/353 |
| 2015/0124157 A1* | 5/2015 | Hongu | G03B 13/36 348/353 |

(Continued)

FOREIGN PATENT DOCUMENTS

JP    2013-025246 A    2/2013

*Primary Examiner* — Pritham Prabhakher

(74) *Attorney, Agent, or Firm* — Cowan, Liebowitz & Latman, P.C.

(57) ABSTRACT

A control apparatus includes a determiner (121*b*) configured to determine a focus direction based on a refocus signal generated from a first pixel signal and a second pixel signal, and a focus detector (121*a*) configured to perform a focus detection by a phase difference detection method based on the first and second pixel signals obtained after driving a lens in the focus direction.

14 Claims, 11 Drawing Sheets

(56) References Cited

U.S. PATENT DOCUMENTS

2015/0145988 A1* 5/2015 Numata .................. G06T 5/002
                                                              348/135
2015/0195446 A1* 7/2015 Saito .................. H04N 5/23219
                                                              348/353

* cited by examiner

CONTROL APPARATUS, IMAGE PICKUP APPARATUS, CONTROL METHOD, AND NON-TRANSITORY COMPUTER-READABLE STORAGE MEDIUM

BACKGROUND OF THE INVENTION

Field of the Invention

The present invention relates to an image pickup apparatus that performs auto-focusing based on an output signal from an image pickup element.

Description of the Related Art

Conventional focus detections include a focus detection (image pickup plane phase difference AF) by an image pickup plane phase difference detection method that performs a focus detection by a phase difference detection method based on a focus detection signal, and a focus detection (contrast AF) by a contrast detecting method based on a contrast value of an image signal.

U.S. Pat. No. 4,410,804 discloses an image pickup apparatus including a two-dimensional image pickup element in which one micro lens and a plurality of divided photoelectrical convertors are formed for each pixel. The image pickup apparatus of U.S. Pat. No. 4,410,804 calculates a correlation amount from a focus detection signal output from a pixel (focus detection pixel) having each divided photoelectrical convertor, and calculates an image shift amount from this correlation amount, thereby performing a focus detection by the phase difference detection method.

Japanese Patent Laid-open No. 2013-25246 discloses an image pickup apparatus that performs a focus detection by the phase difference detection method and a focus detection by the contrast detecting method based on the contrast value. The image pickup apparatus of Japanese Patent Laid-open No. 2013-25246 performs the focus detection by the phase difference detection method up to the vicinity of an in-focus position, and then performs the focus detection by the contrast detecting method based on the contrast value.

However, the image pickup apparatus disclosed in Japanese Patent Laid-open No. 2013-25246 may start a focus detection operation in a direction opposite to a direction toward an object outside a detectable defocus range because it first performs the focus detection by the phase difference detection method. As a result, a fast focus detection operation is prevented, and a photo opportunity (scene that a photographer wants to photograph) may be missed. Furthermore, the focus detection operation starting in the direction opposite to the object degrades an operation quality.

On the other hand, an image pickup lens needs to be driven to determine the direction by the contrast AF like a wobbling control, which may cause degradation of the operation quality such as an image blur and an image shake due to image magnification variation.

SUMMARY OF THE INVENTION

The present invention provides a control apparatus, an image pickup apparatus, a control method, and a non-transitory computer-readable storage medium which are capable of a fast high-quality focus detection.

A control apparatus as one aspect of the present invention includes a determiner configured to determine a focus direction based on a refocus signal generated from a first pixel signal and a second pixel signal, and a focus detector configured to perform a focus detection by a phase difference detection method based on the first and second pixel signals obtained after driving a lens in the focus direction.

An image pickup apparatus as another aspect of the present invention includes an image pickup device including a plurality of first pixels and a plurality of second pixels, each pixel being capable of outputting a focus detection signal for performing a focus detection calculation by a phase difference detection method, a determiner configured to determine a focus direction based on a refocus signal generated from a first pixel signal of the first pixel and a second pixel signal of the second pixel, and a focus detector configured to perform a focus detection by a phase difference detection method based on the first and second pixel signals obtained after driving a lens in the focus direction.

A control method as another aspect of the present invention includes the steps of determining a focus direction based on a refocus signal generated from a first pixel signal and a second pixel signal, driving a lens in the focus direction, and performing a focus detection by a phase difference detection method based on the first and second pixel signals.

A non-transitory computer-readable storage medium as another aspect of the present invention stores a program configured to cause a computer to execute a processing comprising the steps of determining a focus direction based on a refocus signal generated from a first pixel signal and a second pixel signal, driving a lens in the focus direction, and performing a focus detection by a phase difference detection method based on the first and second pixel signals.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

[Embodiment 1]

Figure 1:
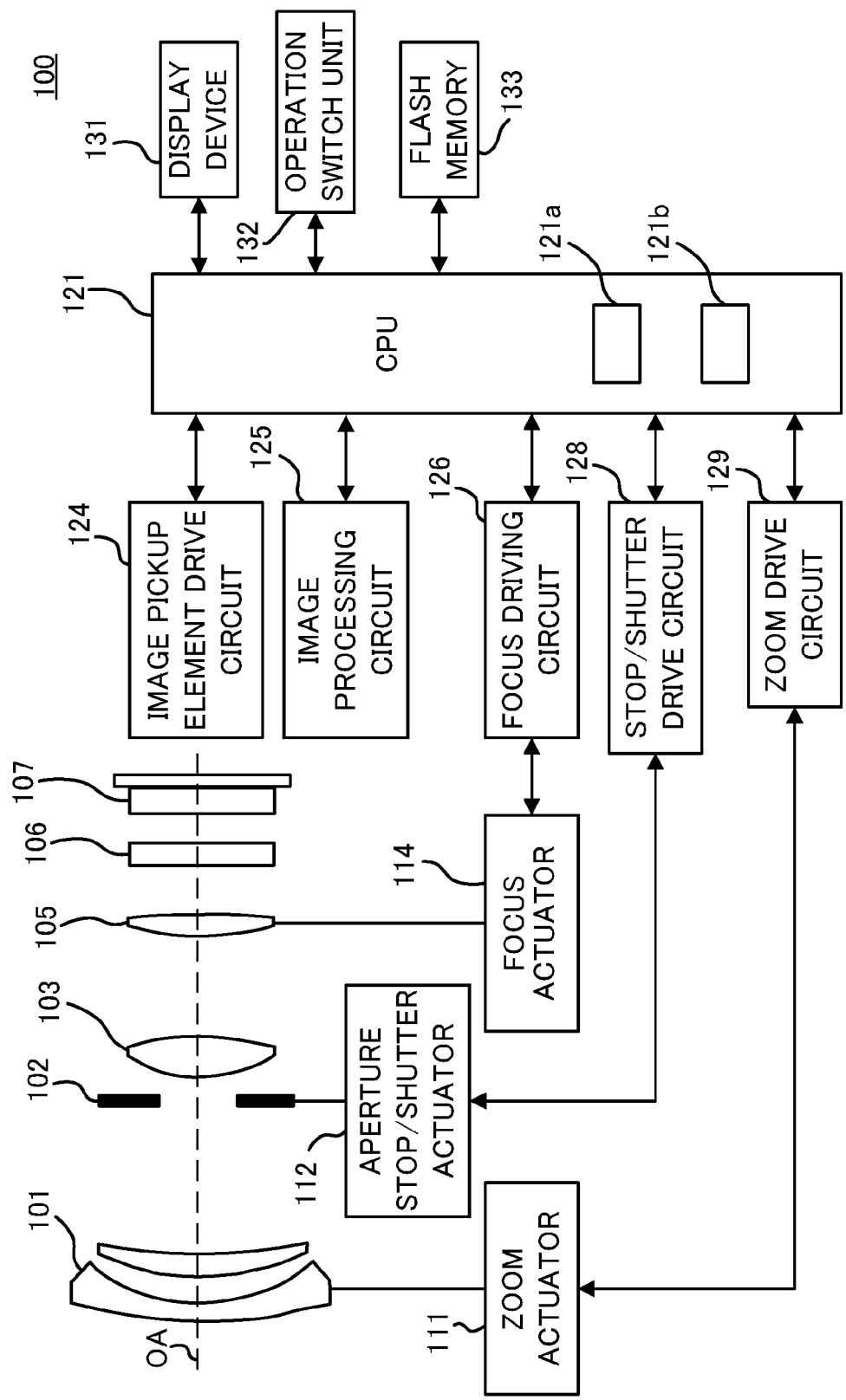
FIG. 1 is a configuration diagram of an image pickup apparatus according to each of embodiments of the present invention.

First, a schematic configuration of an image pickup apparatus according to Embodiment 1 of the present invention will be described with reference to FIG. 1. FIG. 1 is a configuration diagram an image pickup apparatus 100. The image pickup apparatus 100 integrally includes an image pickup apparatus body (camera body) including an image pickup element 107, and an image-pickup optical system (image pickup lens). However, the present embodiment is not limited thereto, and is applicable to an image pickup apparatus including the image pickup apparatus body and a lens apparatus (the image-pickup optical system) detachably attached to the image pickup apparatus body. The image pickup apparatus 100 can record a moving image and a still image.

A first lens unit 101 is disposed at a front end of the image-pickup optical system (an imaging optical system), and movably held in a direction (optical axis direction) of an optical axis OA. An aperture stop/shutter 102 (aperture stop unit) performs a light quantity adjustment at image capturing by adjusting its opening diameter. The aperture stop-shutter 102 has a function of an exposure second adjusting shutter at still image capturing. A second lens unit 103 moves integrally with the aperture stop/shutter 102 in the optical axis direction, and provides a magnification-varying effect (zoom function) cooperatively with a move operation of the first lens unit 101. A third lens unit 105 (focus lens) performs focusing by moving in the optical axis direction. An optical low-pass filter 106 is an optical element for reducing any false color and moire in a captured image.

The image pickup element 107 (image pickup device) includes a two-dimensional CMOS photosensor and its peripheral circuit, and is disposed on an imaging plane of the image-pickup optical system. Such a configuration allows the image pickup element 107 to photoelectrically convert an object image (optical image) obtained through the image-pickup optical system so as to output an image signal. According to the present embodiment, the first lens unit 101, the aperture stop-shutter 102, the second lens unit 103, the third lens unit 105, and the optical low-pass filter 106 constitute the image-pickup optical system (imaging optical system).

A zoom actuator 111 drives to move the first lens unit 101 and the second lens unit 103 in the optical axis direction by rotating a cam barrel not illustrated, thereby performing a magnification-varying operation. An aperture stop-shutter actuator 112 controls the opening diameter of the aperture stop-shutter 102 to adjust an image capturing light quantity and perform an exposure time control at still image capturing. A focus actuator 114 drives to move the third lens unit 105 in the optical axis direction so as to perform focusing.

A CPU 121 (control apparatus) is a camera CPU (camera controller) that performs various controls the camera body, and includes a calculator, a ROM, a RAM, an A/D converter, a D/A converter, and a communication interface circuit. The CPU 121 drives various circuits of the camera body in accordance with a predetermined program stored in the ROM so as to execute a series of operations such as AF, image capturing, image processing, and recording. According to the present embodiment, the CPU 121 includes a focus detector 121a and a determiner 121b. The focus detector 121a performs a focus detection by a phase difference detection method based on an output signal from the image pickup element 107. The determiner 121b determines (calculates) a focus direction (focus detection direction) by refocus processing.

An image pickup element drive circuit 124 controls an image pickup operation of the image pickup element 107, and performs an A/D conversion on the image signal output from the image pickup element 107 to transmit this image signal to the CPU 121. An image processing circuit 125 performs image processing such as $\gamma$ conversion, color interpolation, and JPEG compression on the image signal obtained from the image pickup element 107.

A focus driving circuit 126 controls drive of the focus actuator 114 based on a result of the focus detection, and drives to move the third lens unit 105 in the optical axis direction so as to perform focusing. A stop/shutter drive circuit 128 controls drive of the aperture stop-shutter actuator 112 so as to control an opening of the aperture stop-shutter 102. A zoom drive circuit 129 drives the zoom actuator 111 in accordance with a zoom operation by a photographer.

A display device 131 includes, for example, an LCD, and displays information related to an image capturing mode of the camera body, a preview image before image capturing, a check image after image capturing, an in-focus state display image at focus detection, for example. An operation switch unit 132 includes, for example, a power switch, a release (image capturing trigger) switch, a zoom operation switch, and an image capturing mode selecting switch. A flash memory 133 is a detachable flash memory, and records a captured image.

Figure 2:
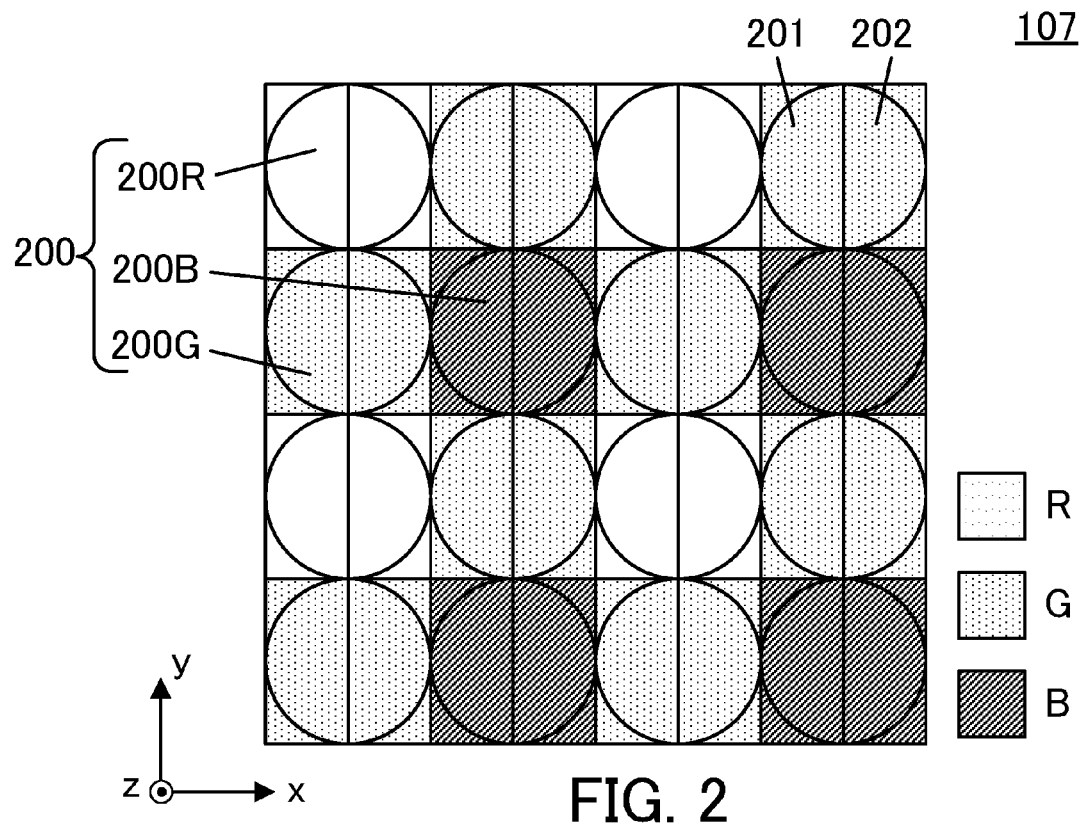
FIG. 2 illustrates a pixel array according to each of the embodiments.
Figures 3A, 3B:
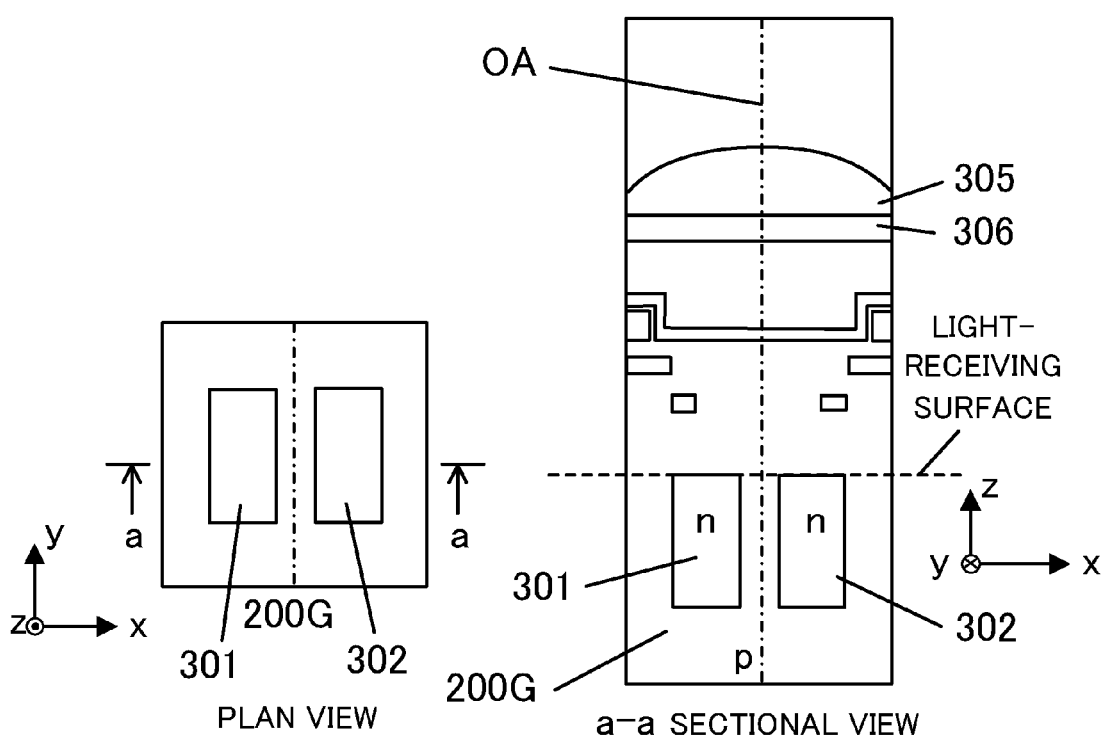
FIGS. 3A and 3B illustrate a pixel structure according to each of the embodiments.

Next, a pixel array and pixel structure of the image pickup element 107 according to the present embodiment will be described with reference to FIGS. 2, 3A, and 3B. FIG. 2 illustrates the pixel array of the image pickup element 107. FIGS. 3A and 3B illustrate the pixel structure of the image pickup element 107. FIG. 3A is a plan view (viewed from a positive z direction) of a pixel 200G of the image pickup element 107, and FIG. 3B is a sectional view (viewed from a negative y direction) taken along line a-a in FIG. 3A.

FIG. 2 illustrates the pixel array (image capturing pixel array) of the image pickup element 107 (two-dimensional CMOS sensor) in a range of 4 columns×4 rows. According to the present embodiment, each image pickup pixel (pixel 200R, 200G, 200B) is constituted by focus detection pixels 201 and 202 (two pupil-division sub-pixels). Thus, FIG. 2 illustrates an array of focus detection pixels in a range of 8 columns×4 rows.

As illustrated in FIG. 2, a pixel group 200 of 2 columns×2 rows has a Bayer array of the pixels 200R, 200G, and 200B. In other words, the pixel group 200 includes the pixel 200R having a spectral sensitivity to red (R) at an upper-left position, the pixel 200G having a spectral sensitivity to green (G) at upper-right and lower-left positions, and the pixel 200B having a spectral sensitivity to blue (B) at a lower-right position. Each of the pixels 200R, 200G, and 200B (each image pickup pixel) is constituted by the focus detection pixel 201 (first focus detection pixel) and the focus detection pixel 202 (second focus detection pixel) that are arrayed in 2 columns×1 rows. The focus detection pixel 201 receives a light beam passing through a first pupil region of the imaging optical system. The focus detection pixel 202 receives a light beam passing through a second pupil region of the imaging optical system. As illustrated in FIG. 2, the image pickup element 107 includes, on its plane, a plurality of arrays each constituted by image pickup pixels of 4 columns×4 rows (focus detection pixels of 8 columns×4 rows), and outputs image signals (focus detection signals).

The image pickup element 107 according to the present embodiment includes a number N of pixels of 5575 columns×3725 rows=20,750,000 pixels approximately with a period P of pixels of 4 µm, and a number NAF of focus detection pixels of 11150 columns×3725 rows=41,500,000 pixels approximately with a column direction period PAF of focus detection pixels of 2 µm. However, the present embodiment is not limited thereto.

As illustrated in FIG. 3B, the pixel 200G according to the present embodiment is provided with a micro lens 305 for condensing incident light, on a light-receiving surface of the pixel. The micro lens 305 is disposed at a position away from the light-receiving surface by a predetermined distance in a z direction (direction of the optical axis OA). The pixel 200G includes photoelectrical convertors (photoelectrical conversion elements) 301 and 302 formed through NH division (2 division) in an x direction and NV division (1 division) in a y direction. The photoelectrical convertors 301 and 302 correspond to the focus detection pixels 201 and 202, respectively.

The photoelectrical convertors 301 and 302 are each configured as a photodiode having a PIN structure in which an intrinsic layer is disposed between a p-type layer and an n-type layer. The intrinsic layer may be omitted and configured as a p-n junction photodiode as necessary. The pixel 200G (each pixel) is provided with a color filter 306 between the micro lens 305 and the photoelectrical convertors 301 and 302. Each sub-pixel (focus detection pixel) may be provided with the color filter 306 having a different spectral transmittance or no color filter, as necessary.

As illustrated in FIGS. 3A and 3B, light incident on the pixel 200G is condensed through the micro lens 305, dispersed through the color filter 306, and received by the photoelectrical convertors 301 and 302. In the photoelectrical convertors 301 and 302, pairs of an electron and a hole are generated depending on the amount of the light thus received and are separated through a depleted layer, and then electrons with negative electric charge are accumulated in the n-type layer. On the other hand, holes are ejected to the outside of the image pickup element 107 through the p-type layer connected to a constant-voltage source (not illustrated). Electrons accumulated in the n-type layers of the photoelectrical convertors 301 and 302 are transferred to a capacitor (FD: floating diffusion) through a transfer gate and converted into a voltage signal.

Figure 4:
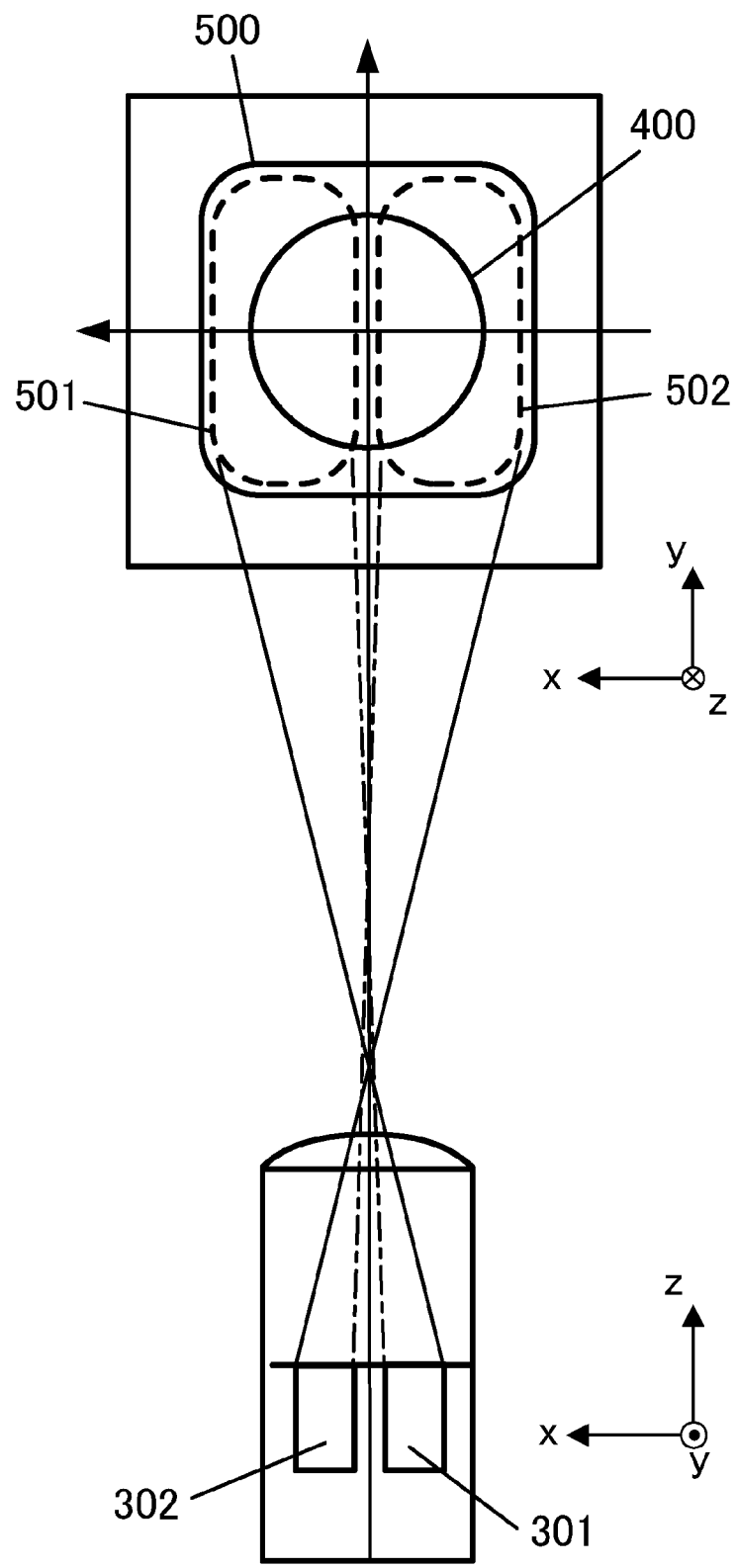
FIG. 4 is an explanatory diagram of an image pickup element and a pupil dividing function according to each of the embodiments.

Next, a pupil dividing function of the image pickup element 107 will be described with reference to FIG. 4. FIG. 4 is an explanatory diagram of the pupil dividing function of the image pickup element 107, illustrating a pupil division of one pixel group. FIG. 4 is a sectional view of a section a-a of the pixel structure illustrated in FIG. 3A, which is viewed from the positive y direction, and illustrates an exit pupil surface of the imaging optical system. In FIG. 4, an x axis and a y axis in the sectional view are inverted with respect to an x axis and a y axis in FIGS. 3A and 3B, respectively, for correspondence to coordinate axes of the exit pupil surface.

In FIG. 4, a partial pupil region 501 (first partial pupil region) of the focus detection pixel 201 (first focus detection pixel) and a light-receiving surface of the photoelectrical convertor 301 whose barycenter is decentered in the negative x direction have a substantially conjugate relation with respect to the micro lens 305. Thus, the partial pupil region 501 is a pupil region of the focus detection pixel 201, which can receive light. The partial pupil region 501 of the focus detection pixel 201 has a barycenter decentering in the positive x direction on the pupil surface. A partial pupil region 502 (second partial pupil region) of the focus detection pixel 202 (second focus detection pixel) has a substantially conjugate relation with a light-receiving surface of the photoelectrical convertor 302 whose barycenter is decentered in the positive x direction with respect to the micro lens 305. Thus, the partial pupil region 502 is a pupil region of the focus detection pixel 202, which can receive light. The partial pupil region 502 of the focus detection pixel 202 has a barycenter decentering in the negative x direction on the pupil surface. A pupil region 500 is a pupil region of the entire pixel 200G, which can receive light, including both the photoelectrical convertors 301 and 302 (focus detection pixels 201 and 202). In FIG. 4, reference numeral 400 denotes an exit pupil of the imaging optical system.

Figure 5:
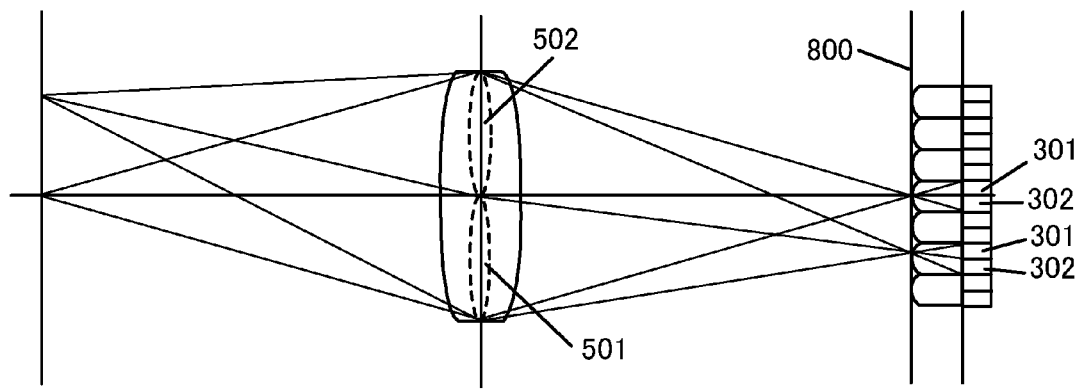
FIG. 5 is an explanatory diagram of the image pickup element and the pupil dividing function according to each of the embodiments.

FIG. 5 is an explanatory diagram of the image pickup element 107 and the pupil dividing function. Light beams passing through the partial pupil regions 501 and 502 of the pupil region of the imaging optical system, which are different from each other, are incident on pixels of the image pickup element 107 at an image pickup plane 800 of the image pickup element 107 at angles different from each other, and received by the focus detection pixels 201 and 202 as divisions of 2×1. The present embodiment describes the case in which the pupil region of the imaging optical system is divided into two regions in a horizontal direction, but is not limited thereto. The pupil division may be provided in other directions such as a vertical direction, as necessary.

According to the present embodiment, a plurality of image pickup pixels constituted by the focus detection pixel 201 (first focus detection pixel) and the focus detection pixel 202 (second focus detection pixel) are arrayed, but the present embodiment is not limited thereto. As necessary, the image pickup pixels, the first focus detection pixel, and the second focus detection pixel may be disposed as separate pixels so that the first focus detection pixel and the second focus detection pixel are disposed partially (discretely) in parts of an array of image pickup pixels.

According to the present embodiment, a light-reception signal is collected from the focus detection pixel 201 (first focus detection pixel) of each pixel of the image pickup element 107 to generate a first focus detection signal, and is collected from the focus detection pixel 202 (second focus detection pixel) of the pixel to generate a second focus detection signal, thereby performing a focus detection. According to the present embodiment, an image signal (captured image) at a resolution of the number N of effective pixels is generated by adding the signals from the first and second focus detection pixels for each pixel of the image pickup element 107.

Figure 6:
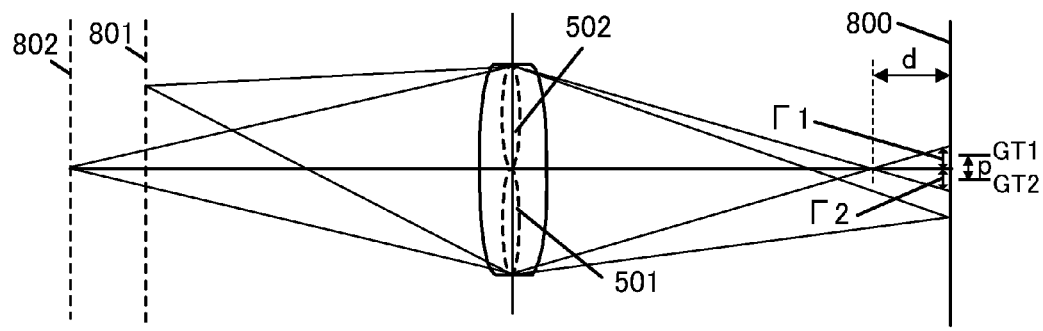
FIG. 6 is a relational diagram of a defocus amount and an image shift amount according to each of the embodiments.

Next, a relation between a defocus amount and an image shift amount of the focus detection signal (first focus detection signal) output from the focus detection pixel 201 of the image pickup element 107 and the focus detection signal (second focus detection signal) output from the focus detection pixel 202 will be described with reference to FIG. 6. FIG. 6 is a relational diagram of the defocus amount and the image shift amount. FIG. 6 illustrates that the image pickup element 107 is disposed on the image pickup plane 800, and the exit pupil of the imaging optical system is divided into the two partial pupil regions 501 and 502 as in FIGS. 4 and 5.

The defocus amount d is defined so that |d| is a distance from an imaging position of an object to the image pickup plane 800. The defocus amount d is defined to be negative (d<0) for a short-focus state in which the imaging position is closer to the object than the image pickup plane 800, and positive (d>0) for an over-focus state in which the imaging position is further away from the object than the image pickup plane 800. The defocus amount d=0 is held for an in-focus state in which the imaging position of the object is at the image pickup plane 800 (in-focus position). FIG. 6 illustrates an object 801 in the in-focus state (d=0) and an object 802 in the short-focus state (d<0). The short-focus state (d<0) and the over-focus state (d>0) are collectively referred to as a defocus state (|d|>0).

In the short-focus state (d<0), among light beams from the object 802, a light beam passing through the partial pupil region 501 (or the partial pupil region 502) is once condensed. Thereafter, this light beam is broadened to have a width Γ1 (Γ2) centered at a centroid position GT1 (GT2) of the light beam, and form a blurred image on the image pickup plane 800. This blurred image is received by the focus detection pixel 201 (focus detection pixel 202) included in each pixel arrayed in the image pickup element 107, and the first focus detection signal (second focus detection signal) is generated. Thus, the first focus detection signal (second focus detection signal) is recorded as an object image in which the object 802 is blurred to have the width Γ1 (Γ2) at the centroid position GT1 (GT2) on the image pickup plane 800. The width Γ1 (Γ2) of this blurring of the object image increases generally in proportional to an increase in the size |d| of the defocus amount d. Similarly, the size |p| of the image shift amount p (that is a difference GT1-GT2 between the centroid positions of the light beams) of the object image between the first and second focus detection signals increases generally in proportional to an increase in the size |d| of the defocus amount d. This is the same for the over-focus state (d>0) except that the direction of an image shift of the object image between the first and second focus detection signals is opposite to that of the short-focus state.

As described above, according to the present embodiment, as the sizes of the first and second focus detection signals or the size of the defocus amount of the image signal obtained by adding the first and second focus detection signals increases, the size of the image shift amount between the first and second focus detection signals increases.

Next, the focus detection according to the present embodiment will be described. According to the present embodiment, performed are the focus detection by the phase difference detection method using the relation between the defocus amount and the image shift amount of the first and second focus detection signals, and a direction detection (focus direction determination) by a method (refocus method) based on a refocus principle. Mainly, the focus direction determination is performed by the refocus method out of a detectable defocus range, where it is difficult to calculate the defocus amount by the phase difference detection method. Then, after a focus drive is started, focusing is performed based on an output result of the detection by the phase difference detection method until the in-focus state is achieved. This will be described later in detail.

Next, the focus detection region as a region on the image pickup element 107 that acquires the first and second focus detection signals will be described with reference to FIG. 7.

Figure 7:
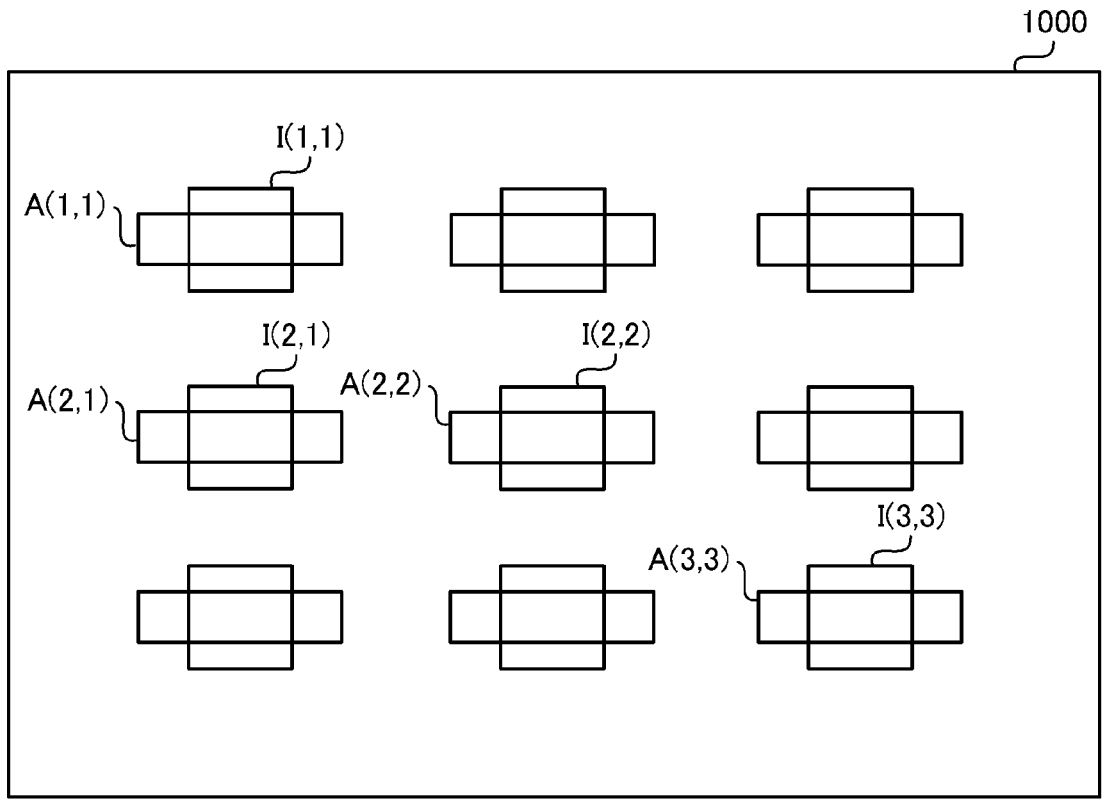
FIG. 7 is an explanatory diagram of a focus detection region according to each of the embodiments.

FIG. 7 is an explanatory diagram of the focus detection region, and illustrates the focus detection region in an effective pixel region 1000 of the image pickup element 107 and an index of the focus detection region displayed on the display device 131 at the focus detection in a superimposing manner.

According to the present embodiment, the nine focus detection regions of three in a row direction times three in a column direction are set. The focus detection region at n-th in the row direction and m-th in the column direction is denoted by A(n,m), and signals from the focus detection pixels 201 and 202 in this focus detection region are used to perform a first focus detection and a second focus detection described later. Similarly, the index of the focus detection region at n-th in the row direction and m-th in the column direction is denoted by I(n,m). The present embodiment sets the focus detection regions of three in the row direction times three in the column direction, but is not limited thereto. In an image pickup element such as the image pickup element 107, in which the first and the second focus detection signals are obtained from every pixel in the effective pixel region 1000, the number, positions, and sizes of the focus detection regions can be changed as appropriate. For example, a predetermined range centered at a region specified by the photographer may be set as the focus detection region.

Next, the focus detection by the phase difference detection method according to the present embodiment will be described with reference to FIG. 8. The focus detection by the phase difference detection method calculates a correlation amount (first evaluation value) indicating a coincidence degree of signals by relatively shifting the first and the second focus detection signals, and detects the image shift amount based on a shift amount with which a favorable correlation (coincidence degree of signals) is obtained. Based on a relation that the size of the image shift amount between the first and the second focus detection signals increases as the size of the defocus amount of an image signal increases, the image shift amount is converted into a first detected defocus amount to perform the focus detection.

Figure 8:
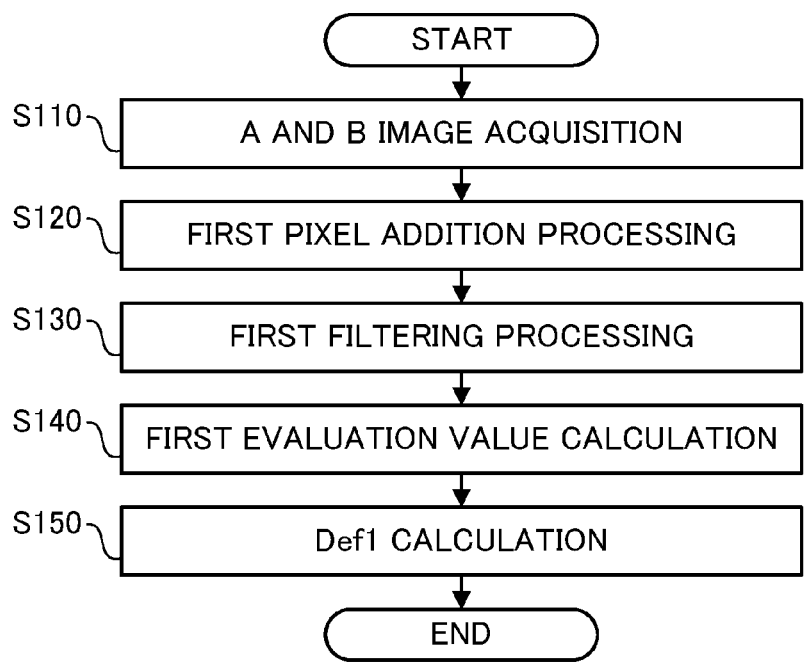
FIG. 8 is a flowchart of focus detection processing by a phase difference detection method according to each of the embodiments.

FIG. 8 is a flowchart of focus detection processing by the phase difference detection method. Each step in FIG. 8 is executed mainly by the CPU 121 or by the image pickup element 107 or the image processing circuit 125 based on a command (instruction) from the CPU 121.

First at step S110, the CPU 121 sets the focus detection region to perform focusing in the effective pixel region 1000 of the image pickup element 107. Then, the CPU 121 generates the first focus detection signal (image A) from a light-reception signal from the focus detection pixel 201 (first focus detection pixel) in the focus detection region thus set, and generates the second focus detection signal (image B) from a light-reception signal from the focus detection pixel 202 (second focus detection pixel) in the focus detection region.

Subsequently at step S120, the CPU 121 performs three-pixel addition processing in the column direction on each of the first and the second focus detection signals so as to reduce a signal data amount. The CPU 121 performs Bayer (RGB) addition processing so as to change an RGB signal to a luminance Y signal. In the present embodiment, these two addition processings are collectively referred to as a first pixel addition processing.

Figure 9:
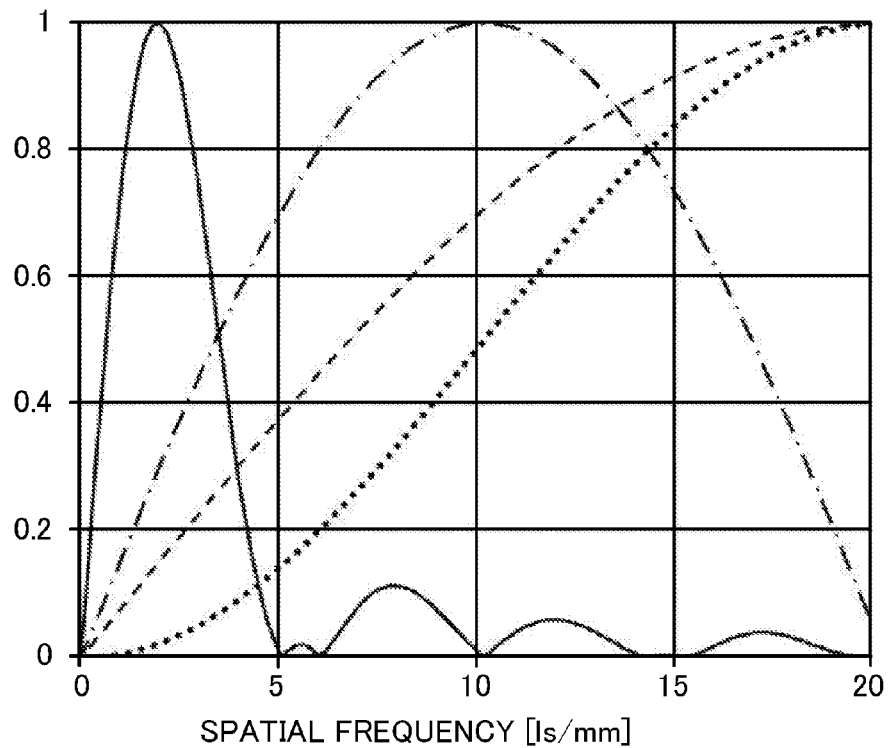
FIG. 9 is an explanatory diagram of filtering processing according to each of the embodiments.

Subsequently at step S130, the CPU 121 performs a first filtering processing on the first and the second focus detection signals. FIG. 9 is an explanatory diagram of the first filtering processing, and illustrates an exemplary pass band in the first filtering processing according to the present embodiment with a solid line. According to the present embodiment, in order to perform the focus detection by the focus detection by the phase difference detection method (first focus detection) outside the detectable defocus range, the pass band for the first filtering processing is set include a low frequency band. As necessary, when focusing is performed from outside to inside of the detectable defocus range, the pass band for the first filtering processing at the first focus detection depending on the defocus state may be adjusted to a higher frequency band as in a dashed line illustrated in FIG. 9.

Subsequently at step S140, the CPU 121 performs a shift processing (first shift processing) to shift the first and the second focus detection signals provided with the first filtering processing relatively in a pupil dividing direction, and calculates the correlation amount (first evaluation value) indicating the coincidence degree of signals. The k-th first and second focus detection signals provided with the first filtering processing are denoted by A (k) and B (k), respectively, and a range with the index k corresponding to the focus detection region is denoted by W. When $s_1$ represents a shift amount obtained by the first shift processing and Ill represents a shift range of the shift amount $s_1$, the correlation amount (first evaluation value) COR is calculated by Expression (1) below.

$$COR(s_1) = \sum_{k \in W} |A(k) - B(k - s_1)|, s_1 \in \Gamma 1 \qquad (1)$$

The CPU 121 subtracts the k-th first focus detection signal A(k) and the (k-$s_1$)-th second focus detection signal B(k-$s_1$) that correspond to each other by the first shift processing with the shift amount $s_1$ so as to generate a shift subtracted signal. Then, the CPU 121 calculates the absolute value of shift subtracted signal thus generated, and sums this absolute value over the index k in the range W corresponding to the focus detection region to calculate the correlation amount COR ($s_1$) as the first evaluation value. As necessary, the correlation amount (first evaluation value) calculated for each row may be summed over a plurality of rows for each shift amount.

Subsequently at step S150, the CPU 121 calculates, through a subpixel calculation from the correlation amount (first evaluation value), a real-valued shift amount for which the correlation amount is at a minimum value, so as to obtain the image shift amount p1. Then, the CPU 121 multiplies the image shift amount p1 by a first conversion coefficient K1 in accordance with the image height of the focus detection region, the f-number of the image pickup lens (imaging optical system), and an exit pupil distance, so as to detect a first defocus amount (Def1). In this manner, according to the present embodiment, the CPU 121 performs the first filtering processing and the first shift processing on the first and the second focus detection signals through the focus detection processing by the phase difference detection method. Then, the CPU 121 calculates the correlation amount, and detects the first defocus amount based on the correlation amount thus calculated.

The image pickup element 107 according to the present embodiment may not be capable of performing a defocus detection when an output of the focus detection by the phase difference detection method degrades outside the detectable defocus range. In this case, such an incapability of the focus detection by the phase difference detection method is output.

Extending the focus detection region allows the focus detection to be performed outside the detectable defocus range. However, the extension of the focus detection region causes such a phenomenon (called perspective conflict) that a plurality of objects exist at different distances in the focus detection range, so that an object other than an intended object is more likely to be focused, and thus is not preferable.

Figure 13:
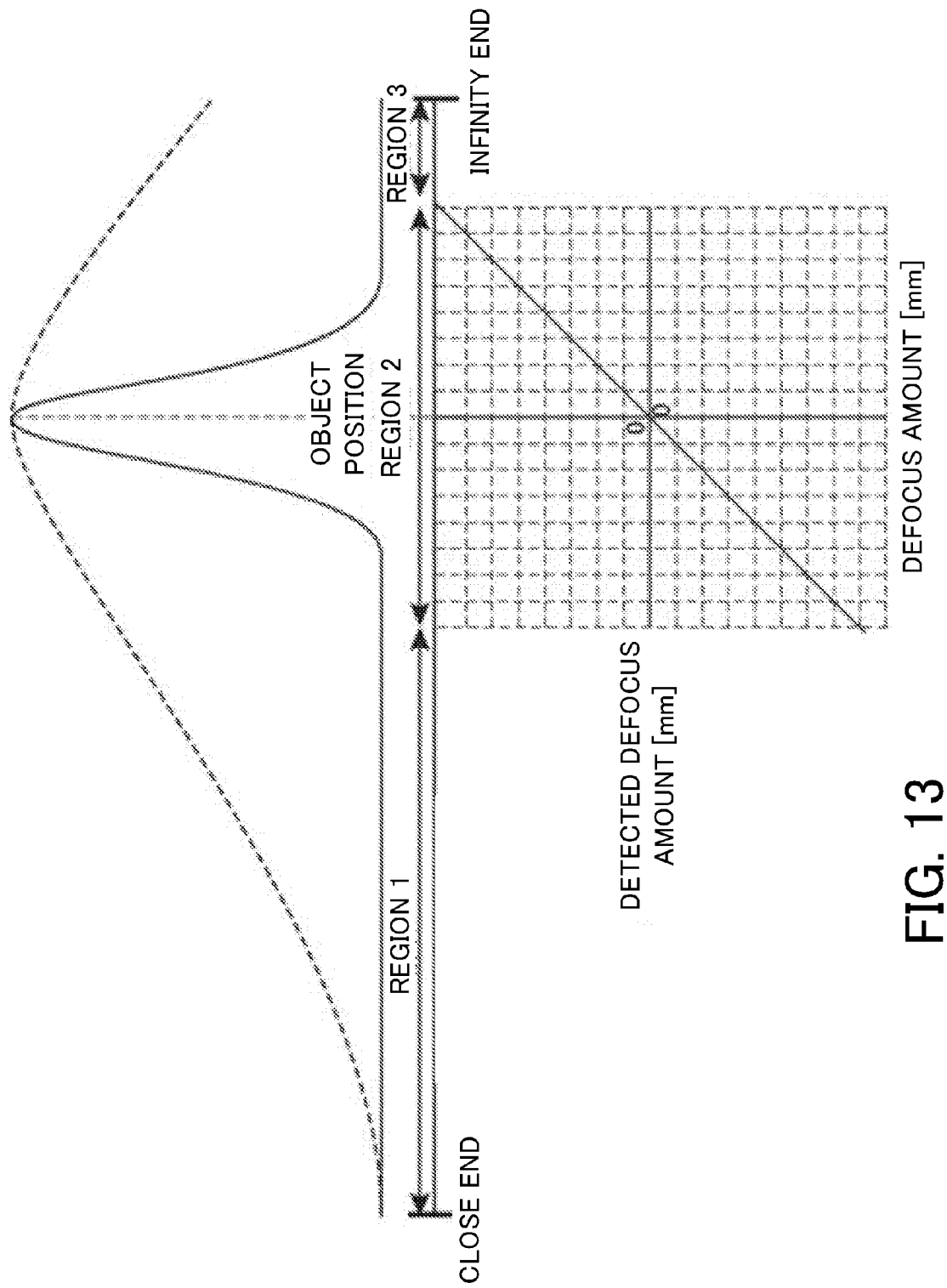
FIG. 13 illustrates a relation between a detectable defocus range and a focus position according to each of the embodiments.

Next, the detectable defocus range will be described with reference to FIG. 13. FIG. 13 illustrates a relation between the detectable defocus range and a focus position. As illustrated in FIG. 13, when the focus position is in a region 2 centered at an object position, the defocus amount is detectable. Thus, the region 2 is in the detectable defocus range. On the other hand, when the focus position in a region 1 closer to a close end (close side) or a region 3 closer to an infinity end (infinity side) relative to the object position, an accurate detection of the defocus amount is impossible. Thus, the regions 1 and 3 are both outside the detectable defocus range.

Next, the focus direction determination by the refocus method (contrast detecting method) according to the present embodiment will be described with reference to FIGS. 10 and 11. In the focus direction determination by the refocus method in the present embodiment, the first and the second focus detection signals are relatively shifted and added together to generate a shift addition signal (refocus signal). Then, a contrast evaluation value of the shift addition signal (refocus signal) thus generated is calculated, and the focus direction is determined based on this contrast evaluation value.

Figure 10:
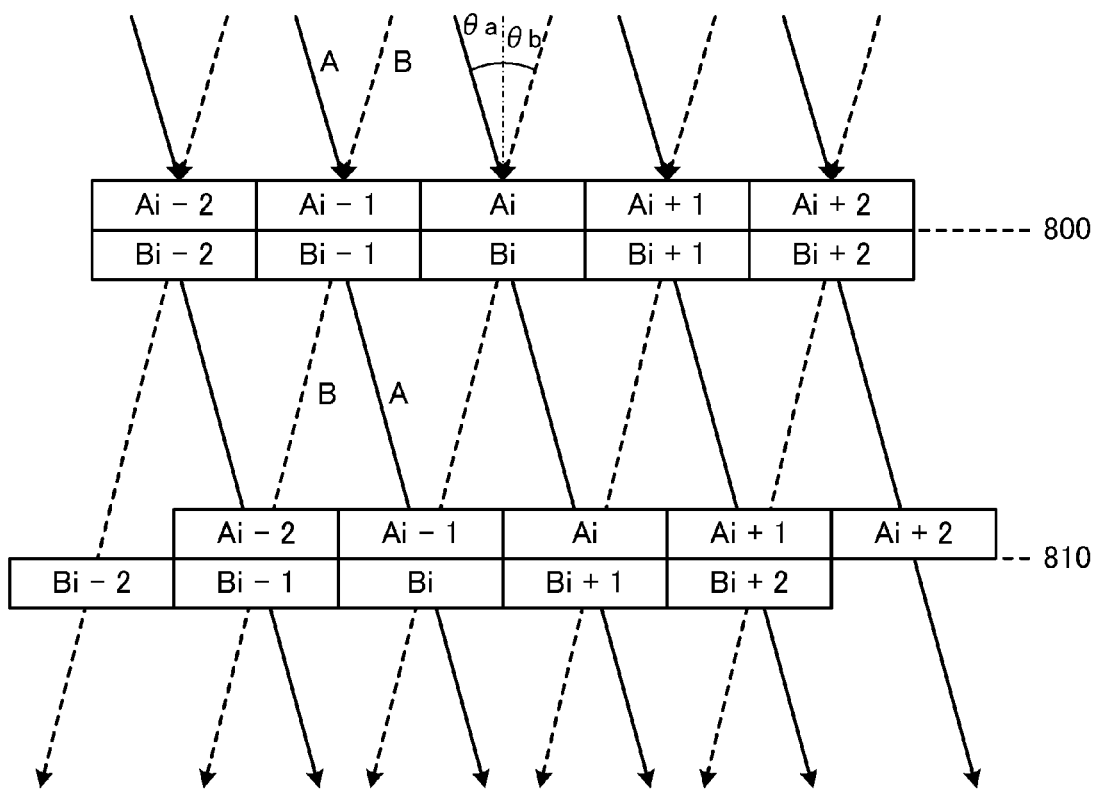
FIG. 10 is a schematic explanatory diagram of refocus processing according to each of the embodiments.

FIG. 10 is an explanatory diagram of the refocus processing in a one-dimensional direction (the column direction or the horizontal direction) based on the first and the second focus detection signals acquired by the image pickup element 107 in the present embodiment. FIG. 10 is a schematic diagram in which i represents an integer, and Ai and Bi represent the first focus detection signal and the second focus detection signal, respectively, from the i-th pixel in the column direction of the image pickup element 107 disposed on the image pickup plane 800. The first focus detection signal Ai is a light-reception signal of a light beam incident on the i-th pixel at a primary light beam angle θa (corresponding to the partial pupil region 501 in FIG. 5). The second focus detection signal Bi is a light-reception signal of a light beam incident on the i-th pixel at a primary light beam angle θb (corresponding to the partial pupil region 502 in FIG. 5).

The first and the second focus detection signals Ai and Bi include incident angle information as well as light intensity distribution information. Thus, a refocus signal on the virtual imaging plane 810 can be generated by translating the first and second focus detection signals Ai and Bi to a virtual imaging plane 810 at the angles θa and θb, respectively, and adding these signals together. The translation of the first focus detection signal Ai to the virtual imaging plane 810 at the angle θa corresponds to a +0.5 pixel shift in the column direction, and the translation of the second focus detection signal Bi to the virtual imaging plane 810 at the angle θb corresponds to a −0.5 pixel shift in the column direction. Thus, the refocus signal on the virtual imaging plane 810 can be generated by adding together the first focus detection signal Ai and the second focus detection signal (Bi+1) that correspond to each other by a relative one-pixel shift of the first and second focus detection signals Ai and Bi. Similarly, the shift addition signal (refocus signal) on each virtual imaging plane in accordance with an integer shift amount can be generated by adding the first and second focus detection signals Ai and Bi provided with an integer shift (shift of an integer number of pixels).

The CPU 121 (determiner 121b) calculates the contrast evaluation value for the shift addition signal (refocus signal) thus generated. Then, the CPU 121 (determiner 121b) performs the focus the direction detection by the refocus method (determines the focus direction) by calculating the focus direction of the object based on a plurality of contrast evaluation values thus calculated.

Figure 11:
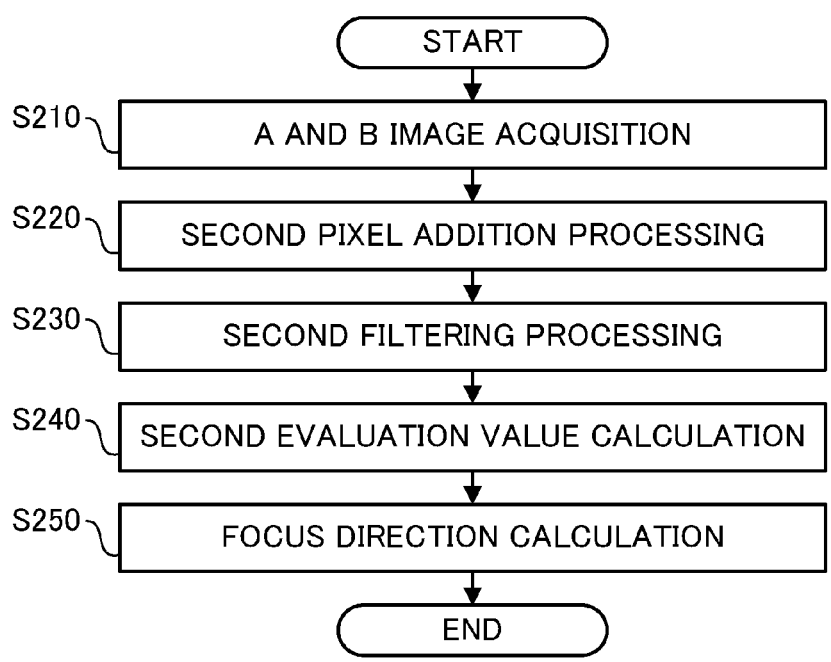
FIG. 11 is a flowchart of determination processing of a focus direction according to Embodiment 1 of the present invention.

FIG. 11 is a flowchart of determination processing of the focus direction according to the present embodiment. Each step in FIG. 11 is executed mainly by the CPU 121 or by the image pickup element 107 or the image processing circuit 125 based on a command (instruction) from the CPU 121.

First at step S210, the CPU 121 sets the focus detection region in which focusing is to be performed in the effective pixel region of the image pickup element 107. Then, the CPU 121 generates the first focus detection signal (image A) from a light-reception signal from the focus detection pixel 201 (first focus detection pixel) in the focus detection region thus set, and generates the second focus detection signal (image B) from a light-reception signal from the focus detection pixel 202 (second focus detection pixel) in the focus detection region.

Subsequently at step S220, the CPU 121 performs the three-pixel addition processing in the column direction on each of the first and the second focus detection signals so as to reduce a signal data amount. The CPU 121 performs the Bayer (RGB) addition processing so as to change an RGB signal to a luminance Y signal. In the present embodiment, these two addition processings are collectively referred to as a second pixel addition processing. As necessary, one or both of the three-pixel addition processing and the Bayer (RGB) addition processing may be omitted.

Subsequently at step S230, the CPU 121 performs second filtering processing on the first and the second focus detection signals. FIG. 9 is an explanatory diagram of the second filtering processing, and illustrates an exemplary pass band in the second filtering processing according to the present embodiment with a dashed line. According to the present embodiment, the CPU 121 performs the focus the direction detection by the refocus method outside the detectable defocus range. Thus, the pass band for the second filtering processing is set to include a frequency band lower than that included in the pass band for the first filtering processing (the solid line or dashed line in FIG. 9). In the second filtering processing, the pass band for the second filtering processing may be adjusted as necessary to move to a higher frequency band as illustrated with a dotted line in FIG. 9 using a Laplacian (second order differential) [1,−2,1] filter that performs an edge extraction on the object signal. The focus detection accuracy can be improved further by extracting a high frequency component of the object to perform the second focus detection.

Subsequently at step S240, the CPU 121 performs a shift processing (second shift processing) to shift the first and the second focus detection signals provided with the second filtering processing relatively in the pupil dividing direction. Then, the CPU 121 adds these signals together to generate the shift addition signal (refocus signal). The CPU 121 calculates the contrast evaluation value (second evaluation value) based on the shift addition signal thus generated.

Subsequently at step S250, the CPU 121 (determiner 121b) determines the focus direction based on a plurality of contrast evaluation values (second evaluation values) obtained by different executions of the second shift processing. The CPU 121 (determiner 121b) compares the contrast evaluation values for two points shifted from each other so as to determine a direction with a higher contrast evaluation value as the focus direction (drive direction). When the reliability is insufficient with two points, statistical processing may be performed on a plurality of shifted contrast evaluation values to determine a direction with a higher contrast.

Next, the focus detection processing according to the present embodiment will be described with reference to FIG. 12. According to the present embodiment, when it is impossible to detect the defocus amount of the imaging optical system by the phase difference detection method, the drive (lens drive) of the focus lens is started in the focus direction (drive direction) determined by the refocus method. Then, the focus detection by the phase difference detection method is executed while the lens drive is performed, focusing is performed to a best in-focus position based on the defocus amount.

Figure 12:
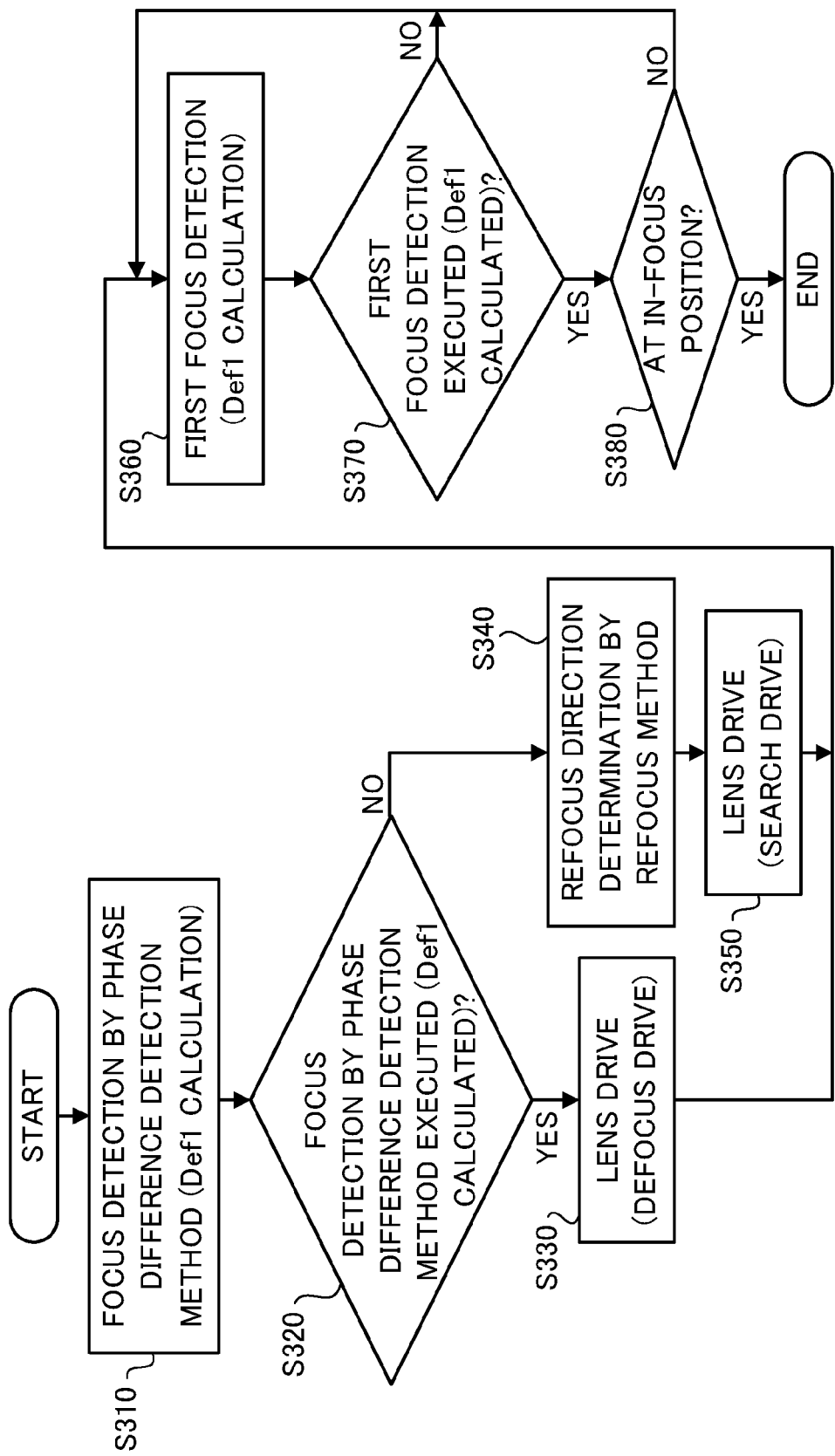
FIG. 12 is a flowchart of focus detection processing according to Embodiment 1.

FIG. 12 is a flowchart of the focus detection processing. Each step in FIG. 12 is executed mainly by the CPU 121 or by the focus driving circuit 126 based on a command (instruction) from the CPU 121.

First at step S310, the focus lens is stopped. The CPU 121 (focus detector 121a) performs the focus detection by the phase difference detection method illustrated in FIG. 8 to calculate the defocus amount Def1. Subsequently at step S320, the CPU 121 determines whether the defocus amount Def1 was calculated at step S310 (in other words, whether the focus detection by the phase difference detection method was executed). The CPU 121 may determine that the defocus amount was not calculable when, for example, the defocus amount Def1 is larger than a predetermined defocus amount, or an aperture value (f-number) is smaller than a predetermined aperture value. However, the present embodiment is not limited thereto, and may determine whether the defocus amount Def1 is calculable based on other reference or whether the defocus amount Def1 was correctly calculated.

When the defocus amount Def1 was calculated (the focus detection was executed) at step S320, the flow proceeds to step S330. Then at step S330, the CPU 121 performs a lens drive (defocus drive) through the focus driving circuit 126 in accordance with the defocus amount Def1 calculated at step S310.

On the other hand, when the defocus amount Def1 was not calculated (the focus detection was not executed) at step S320, the flow proceeds to step S340. Then at step S340, the CPU 121 (determiner 121b) performs the focus direction determination by the refocus method. Subsequently at step S350, the CPU 121 performs a lens drive (search drive) in the focus direction obtained at step S340 through the focus driving circuit 126.

Subsequently at step S360, the CPU 121 (focus detector 121a) performs the focus detection by the phase difference detection method (first focus detection) illustrated in FIG. 8 in a state after the lens drive executed at step S330 or S350, so as to calculate the defocus amount Def1. Subsequently at step S370, the CPU 121 determines whether the defocus amount Def1 is calculated (in other words, the first focus detection was executed) at step S360. When the defocus amount Def1 was calculated (the first focus detection was executed), the flow proceeds to step S380. Then at step S380, the CPU 121 determines whether the in-focus position was reached (in other words, focusing was performed to the vicinity of the best in-focus position). When it is determined that focusing was performed the vicinity of the best in-focus position, the present flow ends.

On the other hand, when the defocus amount Def1 was not calculated (the first focus detection was not executed) at step S370 or it is determined at step S380 that focusing was not performed to the vicinity of the best in-focus position, the flow returns to step S360.

The direction detection (focus direction determination) by the refocus method does not require a lens drive, thereby achieving a high-quality operation with a reduced power consumption. Since no lens drive is required, the direction detection can be performed a plurality of times before a lens drive, a more reliable direction detection may be performed by a statistical method. According to the present embodiment, when the imaging optical system is outside the detectable defocus range so that the defocus direction of the object cannot be detected, the focus detection operation can be started in the focus direction determined by the refocus method. Thus, a fast high-quality focus detection operation is achievable.

[Embodiment 2]

Next, a focus detection according to Embodiment 2 of the present invention will be described. The present embodiment is different from Embodiment 1 in that the focus direction determination by the refocus method is executed by a depth from defocus (DFD) method in place of the contrast detecting method. Other configuration is the same as that in Embodiment 1, and a description thereof will be omitted.

A blur evaluation value according to the present embodiment is a value representing a blurring state of a captured image and correlated to dispersion of a point spread function of the image-pickup optical system. The point spread function is a function for the spread of a point image having passed through a lens. The dispersion of the point spread function of the image-pickup optical system is correlated to the object distance. In other words, the dispersion of the point spread function of the image-pickup optical system is correlated to the position of the focus lens. Thus, the blur evaluation value and the defocus amount have a correlation.

The focus direction determination by the refocus method according to the present embodiment generates the shift addition signal (refocus signal) by adding the first and the second focus detection signals that are relatively shifted. Then, the blur evaluation value of the shift addition signal (refocus signal) thus generated is calculated, and the focus direction is detected (determined) based on the blur evaluation value thus calculated.

Figure 14:
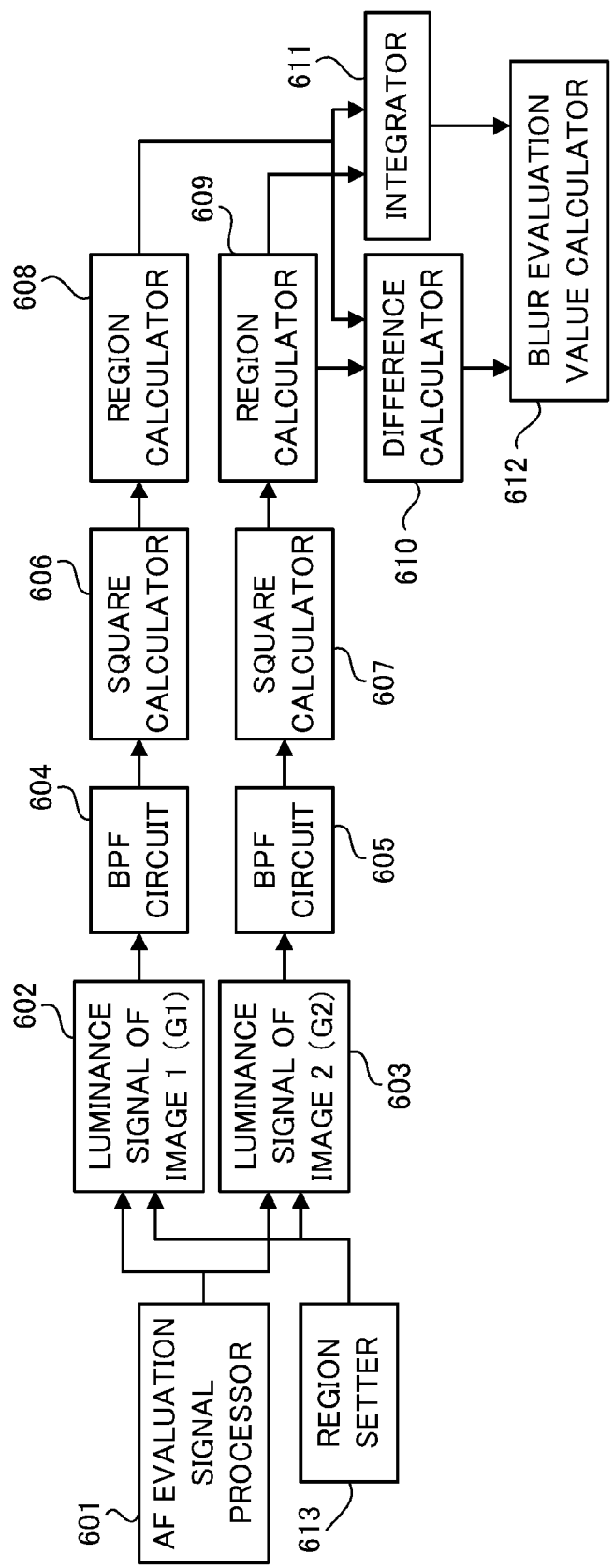
FIG. 14 is a block diagram of a calculator that calculates a blur evaluation value according to Embodiment 2 of the present invention.

The blur evaluation value according to the present embodiment will be described with reference to FIG. 14. FIG. 14 is a block diagram of a calculator of the CPU 121 (part of the CPU 121 including the determiner 121b, and the image processing circuit 125) that calculates the blur evaluation value. An image 1 for outputting the first and the second focus detection signals described in Embodiment 1 and a refocus image (image 2) provided with the shift processing are input to an AF evaluation signal processor 601. The AF evaluation signal processor 601 converts the images 1 and 2 thus input into a luminance signal Y, and executes a gamma correction that enhances a low luminance component and reduces a high luminance component.

The luminance signal Y provided with the gamma correction includes three-color luminance signals of a red luminance signal (RY), a green luminance signal (GY), and a blue luminance signal (BY), and a Y signal obtained adding the luminance signals RY, GY, and BY with predetermined weights. Hereinafter, red, green, and blue are referred to as R, G, and B, respectively. However, the luminance signal Y of the image 1 as an output signal from the AF evaluation signal processor 601 may be any one of RY, GY, BY, and the Y signal, or a plurality of blur evaluation values calculated by combining a plurality of signals, in order to achieve noise reduction and accuracy improvement. Hereinafter, the luminance signals Y of the images 1 and 2 provided with the gamma correction are referred to as a luminance signal 602 (G1) of the image 1 and a luminance signal 603 (G2) of the image 2, respectively.

The luminance signals G1 and G2 are set for a smaller range cut out from an AF evaluation range of m pixels in the lateral direction and n pixels in the longitudinal direction, which is set by a region setter 613. Specifically, when the AF evaluation range has a size of M pixels in the lateral direction and N pixels in the longitudinal direction, M and N are each added with a term that takes into account the number Tap of taps of a filter described later, so as to set a region having (M+Tap) pixels in the lateral direction and (N+Tap) pixels in the longitudinal direction. The luminance signals G1 and G2 are each a two-dimensional signal of (M+Tap) rows and (N+Tap) columns having values in the lateral direction and the longitudinal direction, and can be represented by G1 (i, j) and G2 (i, j), respectively. Here, i is 1 to M+Tap, and j is 1 to N+Tap.

A BPF (band-pass filter) circuit 604 extracts a particular frequency component from the input luminance signal G1 and outputs this frequency component as a signal S1. This extraction of the particular frequency component includes exclusion of, for example, a DC component and high frequency component of the object. The luminance signal G1 passing through the BPF circuit 604 can reduce (or remove, preferably) the dependency of a spatial frequency of the object.

Next, a calculation by the BPF circuit 604 will be described. The BPF circuit 604 first performs a convolution of the luminance signal G1 with a two-dimensional filter (BPF). This convolution calculates the signal S1 (i, j) by Expression (2) below.

$$S1(i,j)=G1(i,j) \otimes BPF \qquad (2)$$

A result of the convolution partially includes incorrect data depending on the size of the two-dimensional filter (BPF). This incorrect partial data is called a tap of the filter. The number (Tap) of taps in the row direction is the number of elements of the filter in the row direction"−1. Similarly, Tap in the column direction is the number of elements of the filter in the column direction"−1. Thus, in order to output only correct data, the signal S1 (i',j') excluding Tap signals from the signal S1 (i, j) as the result of the convolution is set as the output signal from the BPF circuit 604. Here, i' is 1 to M, and j'is 1 to N.

Similarly, the signal S1 (I', j') excluding Tap signals from a signal S2 (i, j) obtained by a convolution of Expression (3) below is output as the luminance signal G2 by a BPF circuit 605.

$$S2(i,j)=G2(i,j) \otimes BPF \qquad (3)$$

The BPF used in Expressions (2) and (3) may be, for example, a two-dimensional filter expressed by Expression (4) below. However, the number of elements of the BPF is changeable depending on a frequency band to be extracted.

$$BPF = \begin{pmatrix} -0.01 & -0.03 & -0.05 & -0.03 & -0.01 \\ -0.03 & 0.31 & 0.69 & 0.31 & -0.03 \\ -0.05 & 0.69 & 1.47 & 0.69 & -0.05 \\ -0.03 & 0.31 & 0.69 & 0.31 & -0.03 \\ -0.01 & -0.03 & -0.05 & -0.03 & -0.01 \end{pmatrix} \quad (4)$$

Next, a square calculator 606 and a region calculator 608 calculate the power of an image signal in a frequency space. This calculation in the frequency space is executed through a calculation in a real space using an expression called Parseval's theorem. According to Parseval's theorem, the sum (integration) of the square of a function equals to the sum (integration) of the square of Fourier transform of the function. Parseval's theorem is written as Expression (5) below in general, stating that the sum of all energies of a waveform s (x) over the entire real space x equals to the sum of the Fourier transform S(f) of the energy of the waveform over all frequency components f.

$$\int_{-\infty}^{+\infty} |s(x)|^2 dx = \int_{-\infty}^{+\infty} |S(f)|^2 df \quad (5)$$

Hereinafter, P represents the power of the image signal in the frequency space, P1 represents the power P of the image 1, and P2 represents the power P of the image 2. To calculate the powers P1 and P2, a square calculation is performed first. Specifically, the square calculator 606 performs a square calculation of Expression (6) below on the signal S1 output from the BPF circuit 604 to generate a signal T1. Similarly, a square calculator 607 performs a square calculation of Expression (7) below on the signal S2 output from the BPF circuit 605 to generate a signal T2.

$$T1(i',j') = S1(i',j') \times S1(i',j') \quad (6)$$

$$T2(i',j') = S2(i',j') \times S2(i',j') \quad (7)$$

Subsequently, to calculate the powers P1 and P2, the region calculators 608 and 609 calculate integrals of the signals T1 and T2 output from the square calculators 606 and 607 over a region of the size of the AF evaluation range, which is M in the lateral direction×N in the longitudinal direction. The output signals P1 and P2 from the region calculators 608 and 609 are calculated by Expressions (8) and (9) below, respectively.

$$P1 = \int_1^M \int_1^N T1(i',j') di dj \quad (8)$$

$$P2 = \int_1^M \int_1^N T2(i',j') di dj \quad (9)$$

However, the region of this integration may be reduced or may be divided into a plurality of regions depending on, for example, the position of a main object and the positions of objects other than the main object. These calculations may be performed after a calculation by a blur evaluation value calculator 612 described later.

In this manner, the power P1 of the image 1 is generated by the square calculator 606 and the region calculator 608. Similarly, the power P2 of the image 2 is generated by the square calculator 607 and region calculator 609.

Figure 15:
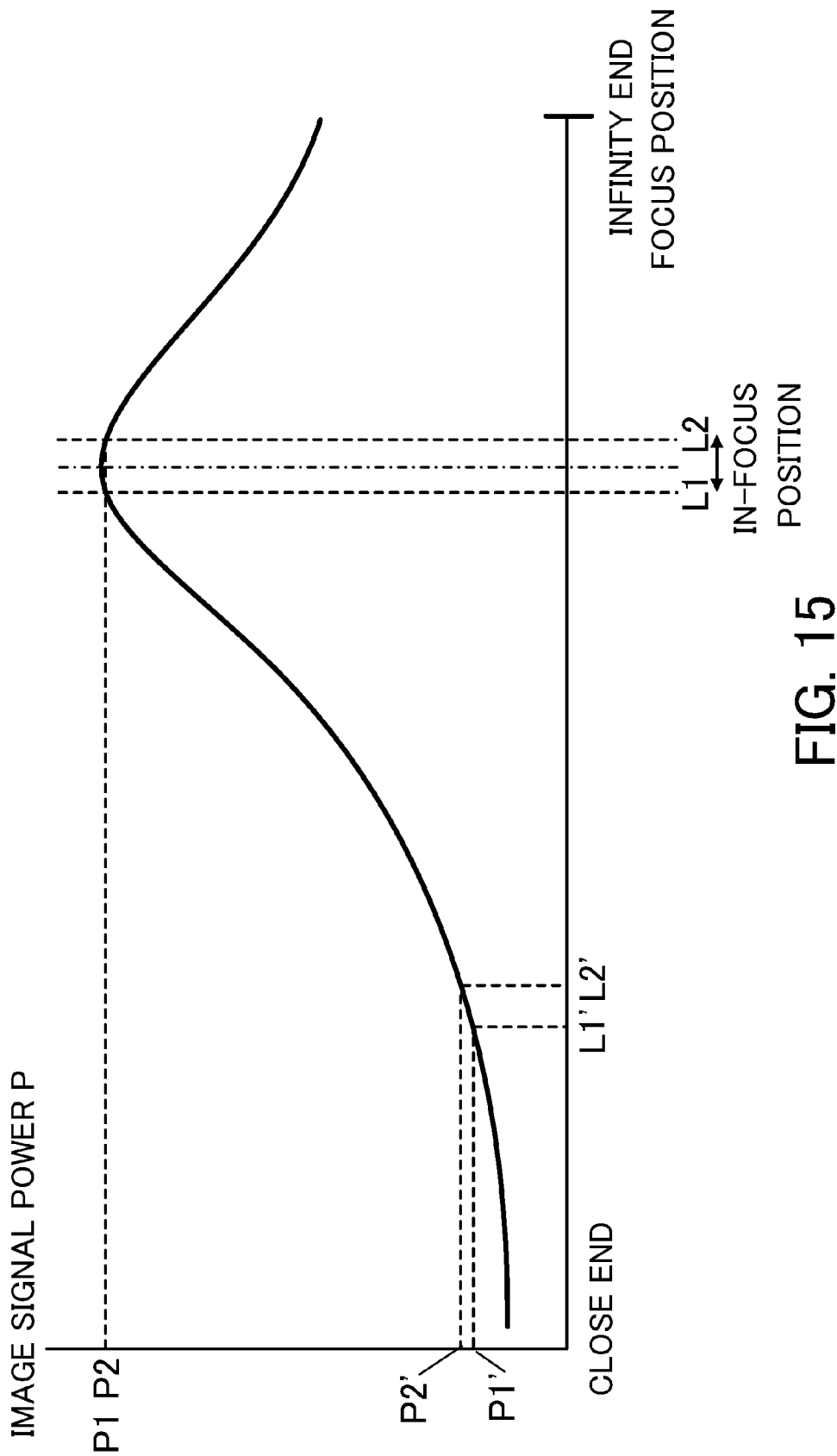
FIG. 15 is a relational diagram of power of an image signal and a focus position according to Embodiment 2.

Next, a relation between the power P (the powers P1 and P2) of an image signal and the focus position (the position of the focus lens) will be described with reference to FIG. 15. FIG. 15 is a relational diagram of the power P of the image signal and the focus position. As illustrated in FIG. 15, the power P of the image signal reaches a maximum value at the in-focus position. This is because the image has a most distinct contrast at the in-focus position so that the power P of the image signal is strongest. On the other hand, as the image becomes blurred further toward the infinity side (infinity end) and the close side (close end) from the in-focus position, the power P gradually decreases. This is because the contrast of the image decreases as the image becomes blurred.

In FIG. 14, a difference calculator 610 calculates a difference P2-P1 between the powers P1 and P2 output from the region calculators 608 and 609. This is to compare the powers P1 and P2 of signals in the frequency space of the image 1 and the image 2, and evaluate a difference in a degree of blurring between the two images. When the two images has a large difference in the degree of blurring, the difference P2-P1 is large (for example, powers P1' and P2' corresponding to focus positions L1' and L2' in FIG. 15). On the other hand, when the two images has a small difference in the degree of blurring, the difference P2-P1 is small (for example, the powers P1 and P2 corresponding to in-focus positions L1 and L2 in FIG. 15).

An integrator 611 calculates a sum P1+P2 of the powers P1 and P2 output from the region calculators 608 and 609. The sum P1+P2 is used in a normalization in a blur evaluation value calculation described later. The blur evaluation value calculator 612 normalizes the output result (P2−P1) of the difference calculator 610 with the output result (P1+P2) of the integrator 611 to calculation the blur evaluation value C by Expression (10) below.

$$C = \frac{P2 - P1}{P1 + P2} \quad (10)$$

As illustrated in FIG. 15, since the image has the most distinct contrast at the in-focus position, the power P of the image signal is strongest. Thus, the CPU 121 (determiner 121b) compares the blur evaluation values C calculated by the blur evaluation value calculator 612 to determine a direction for which the blur evaluation value C is large as the focus direction.

Expression (10) may be replaced with Expression (11) below that performs the normalization with an average value of the powers P1 and P2. Expression (11) is obtained by replacing (P1+P2) in Expression (10) with (P1+P2)/2.

$$C = \frac{P2 - P1}{(P1 + P2)/2} \quad (11)$$

A coefficient may be added on the right hand side of Expression (11) to facilitate the focus detection.

The focus detection processing according to the present embodiment is basically the same as that in Embodiment 1 described with reference to FIG. 12. However, the present embodiment is different from Embodiment 1 in that the DFD method is employed at step S340 (the focus direction determination) in FIG. 12 whereas the contrast detecting method is employed in Embodiment 1. According to the present embodiment, when the imaging optical system is outside the detectable defocus range so that the defocus direction of the object cannot be detected, the focus detection operation can be started in the focus direction determined by the refocus method. Thus, a fast high-quality focus detection operation is achievable.

As described above, in each of the embodiments, the control apparatus (CPU 121) includes the focus detector 121a and the determiner 121b. The determiner 121b determines the focus direction (in which the defocus amount is reduced; closer to the in-focus position) based on the refocus signal generated from a first pixel signal (the first focus detection pixel) and a second pixel signal (the second focus detection pixel). The focus detector 121a performs the focus detection by the phase difference detection method based on the first and second pixel signals obtained after the lens is driven in the focus direction.

Preferably, the focus detector determines whether the defocus amount is calculable through the focus detection by the phase difference detection method (S320). Then, when the focus detector has determined that the defocus amount is not calculable, the determiner determines the focus direction based on the refocus signal (S340). More preferably, when the defocus amount calculated through the focus detection by the phase difference detection method is larger than the predetermined defocus amount, the focus detector determines that the defocus amount is not calculable. Still preferably, when the aperture value (f-number) at the focus detection by the phase difference detection method is smaller than the predetermined aperture value, the focus detector determines that the defocus amount is not calculable.

Preferably, the refocus signal includes the shift addition signal obtained by adding together the first and second pixel signals that are relatively shifted. More preferably, the refocus signal includes a first shift addition signal and a second shift addition signal. The first shift addition signal is obtained by adding the first and second pixel signals that are relatively shifted by a first shift amount (first integer shift amount). The second shift addition signal is obtained by adding the first and second pixel signals that are relatively shifted by a second shift amount (second integer shift amount). One of the first and second shift amounts may be zero.

Preferably, the first and second shift addition signals are refocus signals corresponding to a first virtual imaging position and a second virtual imaging position, respectively. More preferably, the first virtual imaging position corresponds to a position on an infinity side relative to a particular lens position (lens position at which the first and second pixel signals for generating the refocus signals are acquired). The second virtual imaging position corresponds to a position on a close side relative to this particular lens position. More preferably, the determiner determines the focus direction based on evaluation values of the first and second shift addition signals. Still preferably, the determiner compares the evaluation values of the first and second shift addition signals to determine the focus direction for driving the lens toward one of the infinity side and the close side for which a higher one of the evaluation values is obtained.

Preferably, the evaluation values are contrast evaluation values of the first and second shift addition signals (Embodiment 1). Preferably, the evaluation values are blur evaluation values (evaluation values obtained by the DFD method) of the first and second shift addition signals (Embodiment 2).

Preferably, the first pixel signal is a signal output from a first pixel (the first focus detection pixel) that receives a light beam passing through the first partial pupil region (the partial pupil region 501) of the imaging optical system. The second pixel signal is a signal output from a second pixel (the second focus detection pixel) that receives a light beam passing through the second partial pupil region (the partial pupil region 502) of the imaging optical system, which is different from the first partial pupil region.

Preferably, the image pickup apparatus 100 includes the image pickup device (image pickup element 107) including a plurality of the first and second pixels capable of outputting focus detection signals for performing calculation of the focus detection by the phase difference detection method. Preferably, the image pickup device includes a plurality of photoelectrical conversion elements (the photoelectrical convertors 301 and 302) for each of micro lenses two-dimensionally arrayed.

[Other Embodiments]

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each of the embodiments provides a control apparatus, image pickup apparatus, a control method, and a non-transitory computer-readable storage medium, which are capable of a fast high-quality focus detection.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-007603, filed on Jan. 19, 2015, which is hereby incorporated by reference herein in its entirety.

What is claimed is:

1. A control apparatus comprising:
at least one processor configured to function as:
a determiner configured to determine a focus direction based on refocus signals generated from a first pixel signal and a second pixel signal captured by an image capture device; and
a focus detector configured to perform a focus detection by a phase difference detection method based on the first and second pixel signals obtained after driving a lens in the focus direction,
wherein in a case where a defocus amount calculated through the focus detection by phase difference detection method is larger than a threshold, the determiner determines the focus direction based on the refocus signals, and wherein the refocus signals include a shift addition signal obtained by relatively shifting the first and second pixel signals and adding the first and second pixel signals together.

2. The control apparatus according to claim 1, wherein the focus detector determines that the defocus amount is not calculable when an aperture value at the focus detection by the phase difference detection method is smaller than a predetermined aperture value.

3. The control apparatus according to claim 1, wherein the refocus signals include:
- a first shift addition signal obtained by relatively shifting the first and second pixel signals by a first shift amount and adding the first and second pixel signals together; and
- a second shift addition signal obtained by relatively shifting the first and second pixel signals by a second shift amount and adding the first and second pixel signals together.

4. The control apparatus according to claim 3, wherein the first shift addition signal is a refocus signal corresponding to a first virtual imaging position, and the second shift addition signal is a refocus signal corresponding to a second virtual imaging position.

5. The control apparatus according to claim 4, wherein:
- the first virtual imaging position corresponds to a position on an infinity side with respect to a specific lens position, and
- the second virtual imaging position corresponds to a position on a close side with respect to the lens position.

6. The control apparatus according to claim 5, wherein the determiner determines the focus direction based on evaluation values of the first and second shift addition signals.

7. The control apparatus according to claim 6, wherein the determiner:
- compares the evaluation values of the first and second shift addition signals; and
- determines the focus direction to drive the lens toward one of the infinity and close sides corresponding to a higher evaluation value of the evaluation values.

8. The control apparatus according to claim 6, wherein the evaluation values are contrast evaluation values of the first and second shift addition signals.

9. The control apparatus according to claim 6, wherein the evaluation values are blur evaluation values of first and second shift addition signals.

10. The control apparatus according to claim 1, wherein:
- the first pixel signal is a signal output from a. first pixel that receives a light beam passing through a first partial pupil region of an imaging optical system, and
- the second pixel signal is a signal output from a second pixel that receives a light beam passing through a second partial pupil region of the imaging optical system, the second partial pupil region being different from the first partial pupil region.

11. An image pickup apparatus comprising:
- an image pickup device including a plurality of first pixels and a plurality of second pixels, each pixel being capable of outputting a focus detection signal for performing a focus detection calculation by a phase difference detection method; and
- at least one processor configured to function as:
  - a determiner configured to determine a focus direction based on refocus signals generated from a first pixel signal of the first pixel and a second pixel signal of the second pixel; and
  - a focus detector configured to perform the focus detection by the phase difference detection method based on the first and second pixel signals obtained after driving a lens in the focus direction,
- wherein in a case where a defocus amount calculated through the focus detection by the phase difference detection method is larger than a threshold, the determiner determines the focus direction based on the refocus signals, and
- wherein the refocus signals include a shift addition signal obtained by relatively shifting the first and second pixel signals and adding the first and second pixel signals together.

12. The image pickup apparatus according to claim 11, wherein the image pickup device includes a plurality of photoelectrical conversion elements for each of two-dimensionally arrayed micro lenses.

13. A control method comprising the steps of:
- determining a focus direction based on refocus signals generated from a first pixel signal and a second pixel signal captured by an image capture device;
- driving a lens in the focus direction; and
- performing a focus detection by a phase difference detection method based on the first and second pixel signals,
- wherein in a case where a defocus amount calculated through the focus detection by the phase difference detection method is larger than a threshold, the focus direction is determined based on the refocus signals, and
- wherein the refocus signals include a shift addition signal obtained by the relatively shifting the first and second pixel signals and adding the first and second pixel signals together.

14. A non-transitory computer-readable storage medium storing a program configured to cause a computer to execute a process comprising the steps of:
- determining a focus direction based on refocus signals generated from a first pixel signal and a second pixel signal captured by an image capture device;
- driving a lens in the focus direction; and
- performing a focus detection by a phase difference detection method based on the first and second pixel signals,
- wherein in a ease where a defocus amount calculated through the focus detection by the phase difference detection method is larger than a threshold, the focus direction is determined based on the refocus signals, and
- wherein the refocus signals include a shift addition signal obtained by relatively shifting the first and second pixel signals and adding the first and second pixel signals together.

* * * * *